United States Patent
Hahn et al.

(10) Patent No.: US 7,154,742 B1
(45) Date of Patent: Dec. 26, 2006

(54) FLUTED ANODE WITH IMPROVED CAPACITANCE AND CAPACITOR COMPRISING SAME

(75) Inventors: Randy S. Hahn, Simpsonville, SC (US); John T. Kinard, Greer, SC (US); Jeffery P. Poltorak, Greer, SC (US); Eric Zediak, Greenville, SC (US)

(73) Assignee: Kemet Electronics Corporation, Greenville, SC (US)

( * ) Notice: Subject to any disclaimer, the term of this patent is extended or adjusted under 35 U.S.C. 154(b) by 0 days.

(21) Appl. No.: 11/431,385

(22) Filed: May 10, 2006

(51) Int. Cl.
*H01G 9/04* (2006.01)
*H01G 9/145* (2006.01)

(52) U.S. Cl. ............. 361/528; 361/532; 29/25.03
(58) Field of Classification Search ............ 361/523, 361/528–529, 532, 540; 29/25.03
See application file for complete search history.

(56) References Cited

U.S. PATENT DOCUMENTS

| | | | | |
|---|---|---|---|---|
| 3,345,545 A | * | 10/1967 | Bourgualt et al. | 361/529 |
| 5,949,639 A | * | 9/1999 | Maeda et al. | 361/523 |
| 6,042,740 A | * | 3/2000 | Uehara et al. | 252/62.2 |
| 6,191,936 B1 | * | 2/2001 | Webber et al. | 361/528 |
| 2004/0252445 A1 | * | 12/2004 | Wang | 361/508 |
| 2006/0070492 A1 | * | 4/2006 | Qiu | 75/255 |

* cited by examiner

*Primary Examiner*—Eric W. Thomas
(74) *Attorney, Agent, or Firm*—Joseph T. Guy; Nexsen Pruet, LLC (57) ABSTRACT

An anode with narrow flutes (<0.3 mm) allows for the improved penetration of cathode solutions into the anode body and reduces the redistribution which occurs as the solutions are converted to the solid cathode material.

25 Claims, 6 Drawing Sheets

FLUTED ANODE WITH IMPROVED CAPACITANCE AND CAPACITOR COMPRISING SAME

FIELD OF THE INVENTION

The present invention is directed to an improved anode with narrow flutes and improved capacitance, capacitance recovery, and dissipation factor.

BACKGROUND OF THE INVENTION

There is an ongoing need to improve the electrical characteristics of capacitors. Two long term trends in the electronics industry are the on-going miniaturization and reduced cost of the components. For solid electrolytic capacitors increased volumetric efficiency and reduced cost are achieved primarily through the use of higher specific surface area powders of the valve metals used to form the anode body. As the specific surface area of the anode body increases, the pore diameters decrease which presents challenges in the manufacturing process.

The anode of a typical solid electrolytic capacitor consists of a porous anode body, with a lead extending beyond the anode body and connected to the positive mounting termination of the capacitor. The anode is formed by first pressing a valve metal powder into a pellet. Valve metals include Al, Ta, Nb, Ti, Zr, Hf, W, and mixtures, alloys or suboxides of these metals. The anode is sintered to form fused connections between the individual powder particles.

The dielectric is formed on the internal and external surfaces of the porous anode through an anodic oxidation process by application of voltage to the anode while immersed in an electrolyte solution. The thickness of the dielectric film is proportional to the applied voltage.

The cathode of a solid electrolytic capacitor is typically either manganese dioxide or an intrinsically conductive polymer. In either case the internal surfaces of the dielectric are coated with the cathode material by first dipping the anode body in a solution(s) that is subsequently converted to the solid cathode. The dipping process is termed impregnation. In the case of manganese dioxide cathode the anodes are dipped in manganese nitrate solutions which are subsequently converted to manganese dioxide in a thermal decomposition process. This process is commonly called conversion. Intrinsically conductive polymers are formed on the internal surfaces of the dielectric by dipping the anodes in a solution of the monomer and a solution of an oxidizer, either in a single co-mixed solution or as separate solutions in an alternate dip process. Once the monomer and oxidizer impregnate the anode body the polymerization reaction is allowed to occur so that the intrinsically conductive polymer coats the internal dielectric, surfaces. The process by which the oxidizer and monomer are allowed to react is commonly referred, to as polymerization.

The capacitance of a solid electrolytic capacitor is governed by the general equation of capacitance:

$$C=kA/d$$

where C=capacitance k=dielectric constant

A=surface area of the anode/cathode plates, d=distance between the anode and cathode plates or dielectric thickness.

Since the distance between the anode and cathode plate is proportional to the voltage used to form the dielectric in the anodic oxidation process, the formation voltage ($V_f$) can be substituted for d in the general equation for resistance. Furthermore, since the dielectric constant is a material property of the dielectric it can be seen that the multiplicative product of capacitance and formation voltage is proportional to the surface area of the anode. This product is commonly referred to in the industry as CV. The specific surface area of commercial valve metal powders used to manufacture solid electrolytic capacitors is expressed as the product of capacitance times formation voltage divided by the powder weight. This measure of specific surface area of a valve metal powder is commonly referred to as the charge of the powder and it is often abbreviated as CV/g.

Figure 1:
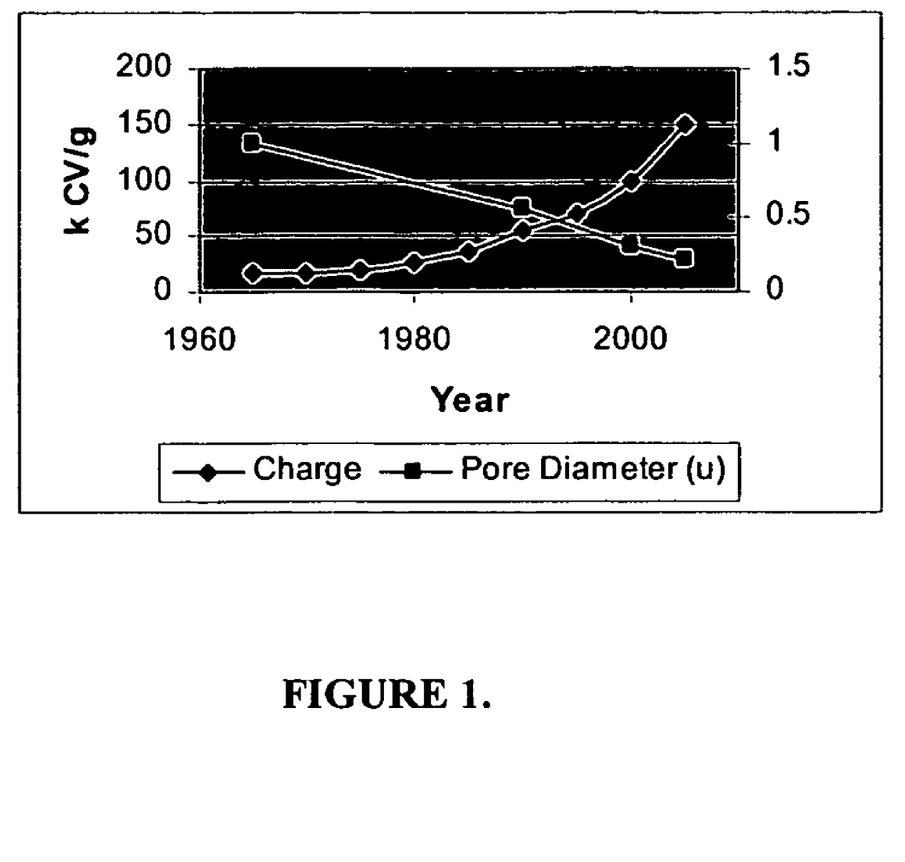
FIG. 1 is a plot of historical changes in CV/g and average pore diameter.

In order to drive the on-going need for miniaturization of electronic components and assemblies, valve metal manufacturers have developed ever higher CV/g powders over the last 40 years as indicated in FIG. 1. As the CV/g has increased, the diameter of the pores has decreased. Coating the internal dielectric surfaces with the solid cathode is very difficult for the high CV/g powders, available, today due to the decreased pore size. Incomplete coating of the internal dielectric surface with the solid cathode results in a loss of capacitance in the finished device. The loss of capacitance due to the incomplete cathode coverage is expressed as capacitance recovery and is defined by Equation 1.

Capacitance recovery=100×(dry capacitance/wet capacitance)  Equation 1

Wet capacitance is determined by the amount of Ta in the anode, the specific surface area of the Ta (CV/g) and the anodization voltage. The equation for calculating wet capacitance from these anode characteristics is calculated in accordance with equation 2.

Wet capacitance=(Ta volume×press density×CV/g)/ (formation voltage)   Equation 2

Dry capacitance is the capacitance measured after application of the solid electrolyte when the anode is in a dry state.

The buildup and uniformity of the solid electrolyte inside the pores of the anode impacts several of the electrical characteristics of the finished device which effect the performance of the capacitor in an electric circuit. Poor or nonuniform buildup causes the resistance of solid electrolyte inside the pores to increase, resulting in increases in equivalent series resistance (ESR) and dissipation factor (DF), and a loss in capacitance at higher frequencies (capacitance roll off). DF is the parameter most often used to measure this characteristic of the solid electrolyte.

Another means of reducing the size of the anode is to increase the anode density. Thus for a given CV/g powder the CV/cc is higher as the anode density is increased. However, as the anode density increases the pore diameters decrease and complete coating of the dielectric surfaces is difficult.

The ability to coat the internal dielectric surfaces is also governed by the size of the anode. For example 150,000 CV/g powders are currently used in commercially available capacitors with anode bodies less than 0.015 cubic centimeters wherein the smallest dimension is approximately 1 mm. However, for anodes greater than approximately 0.05 cubic centimeters, where the smallest dimension is approximately 3.3 mm, the practical limit for CV/g powders in use today is 70,000 CV/g.

Manufacturers of solid electrolytic capacitors have been improving the processes for coating the dielectric surfaces for years. Factors manipulated to improve the impregnation process include solution concentration, dip times, dip speeds, surface tension, and vacuum impregnation. Despite these improvements capacitance recover is less than 50% for large case size anodes pressed from powders with CV/g exceeding 60,000. For capacitors employing manganese dioxide as the cathode, this is largely due to the redistribution of the manganese dioxide during the conversion process. This redistribution occurs in part due to the evolution of gasses which occurs during the reaction:

As these gases escape from the internal body of the anode they carry unreacted manganese nitrate to the outer portions of the anode body. This results in poor coverage of the dielectric surfaces close to the center of the anode and poor capacitance recovery. Similarly as the solvents in the monomer and/or oxidizer solution(s) evaporate prior to, or during, polymerization the evolved gases cause a redistribution of the polymer away from the center of the anode body.

Another important trend in the capacitor industry is the drive to components with low ESR at high frequencies (100 k Hz and higher). In order to reduce ESR, component manufacturers develop means of reducing the resistance of the various elements of the capacitor. Typically the largest contribution to the ESR of the component is due to the resistance of the internal and external cathode layers. The resistance of these elements follow the general equation of resistance as reproduced in Equation 3.

Resistance=resistivity×path length/cross sectional area     Equation 3

Fluted anodes comprising a furrow or groove on the otherwise monolithic capacitor body as described, for example, in U.S. Pat. Nos. 6,191,936, 5,949,639 and 3,345,545 reduce the path length through the internal cathode layer and increase the cross-sectional area for current to flow through the external cathode layer. Capacitors utilizing fluted anodes as illustrated in FIG. 1 enjoy much success and this technique is still utilized in current capacitors. However, the groove cut in the anode reduces the CV of the anode, resulting in lower capacitance of the device.

There has been an ongoing desire to improve impregnation of the anode body thereby allowing for improved capacitance and the ability to take full advantage of higher CV/g powders without sacrifices in equivalent series resistance, dissipation factor or capacitance roll off.

SUMMARY OF THE INVENTION

It is an object of the invention to provide an improved fluted anode, and capacitor comprising the anode.

It is another object of the present invention to provide a capacitor with higher capacitance.

It is yet another object of the present invention to improve the capacitance recovery of the finished capacitor.

A further object of this invention is to improve the uniformity of the cathode coating on the internal dielectric surfaces for high CV/cc anodes.

It is an object of this invention to provide a more uniform coverage of the internal dielectric surfaces with the solid electrolyte.

It is an object of this invention to provide more complete coverage of the internal dielectric surfaces with the solid electrolyte.

It is yet another object of this invention to reduce the DF of solid electrolytic capacitors.

These and other advantages, as will be realized, are provided in an anode with narrow flutes which are less than 0.3 mm inch wide at the widest point.

These and other advantages, as will be realized, are provided in an improved capacitor. The capacitor has an anode with flutes wherein each flute has a width of at least 0.06 mm no more than 0.3 mm. An anode lead extends from the anode and a dielectric is coated on the anode. A cathode is coated on the dielectric. An anode lead is in electrical contact with the anode lead and a cathode lead is in electrical contact with the cathode lead.

Yet another advantage is provided in a process for forming a capacitor. The process includes pressing a powder into an anode comprising flutes with a width of at least 0.06 mm to no more than 0.3 mm. An anode lead is provided wherein the anode lead is in electrical contact with the anode. A dielectric is formed on the anode. A cathode is formed on the dielectric. An anode lead is formed in electrical contact with the anode lead and a cathode lead is formed which is in electrical contact with said cathode.

Yet another embodiment is provided in an improved capacitor. The capacitor has a tantalum anode formed from tantalum powder with a powder charge of at least 50,000 CV/g. The tantalum anode has flutes wherein each flute has a width of no more than 0.3 mm and a depth of 0.50 mm to 1.50 mm. An anode lead extends from the anode. A dielectric is coated on the anode and a cathode is coated on the dielectric. An anode lead is in electrical contact with the anode lead and a cathode lead is in electrical contact with the cathode lead.

DETAILED DESCRIPTION OF THE INVENTION

The present invention will be described with reference to the various figures forming an integral part of the specification. Throughout the various drawings similar elements will be numbered accordingly.

Through diligent research a limitation of the ability to coat the internal surfaces of the anode body has been found to reside in the redistribution of the solid cathode that occurs during the reaction to form the cathode. The redistribution of materials toward the outside of the anode results in the loss of capacitance. By employing very narrow flutes in the anode, the external surfaces of the anode can be brought close to the center of the anode. This results in improved capacitance recovery without the loss of capacitance typical of previously envisioned fluted anodes. The end result is higher capacitance, improved capacitance recovery, and lower cost (through the need for less valve metal powder). In addition to these benefits other electrical measures of the capacitors performance, DF, ESR, capacitance roll off and leakage improve due to the more uniform distribution of the solid cathode.

Figure 2:
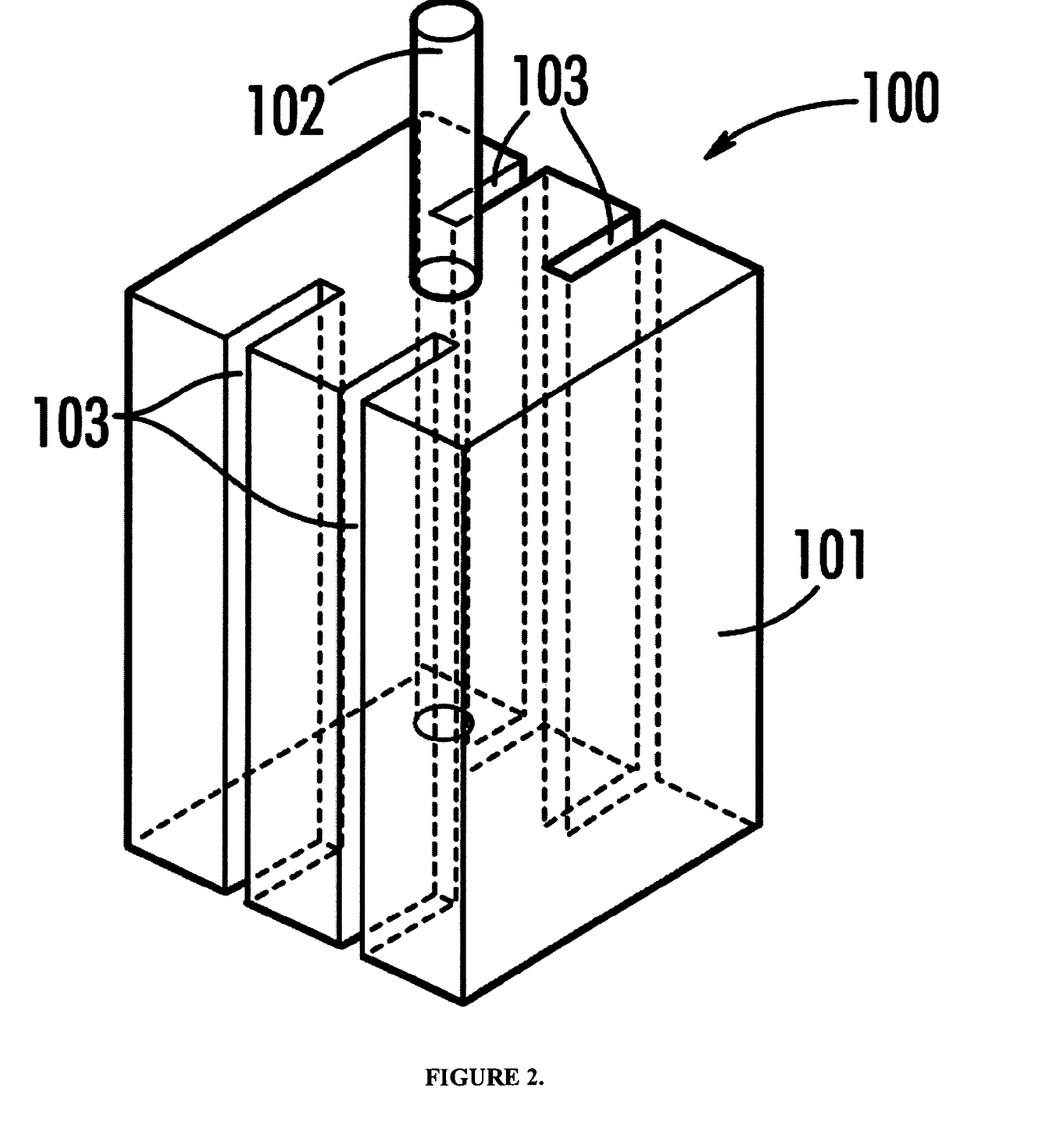
FIG. 2 is a top perspective view of an anode of the present invention.

An anode of the present invention is illustrated in perspective view in FIG. 2. The anode generally represented at 100, comprises a radially compressed anode body, 101, and an anode lead, 102, integral thereto. The anode lead may be welded to the anode body. In a preferred embodiment the anode lead is inserted into the anode powder and secured therein by pressing the powder to form the anode body and securing the anode lead therein by compression. Additional anode leads may be included and the anode lead may have a round, oval or rectangular cross-sectional shape.

The anode body, 101, comprises a series of flutes, 103. Each flute has a width of at least 0.06 mm to no more than 0.3 mm and a depth of at least 0.5 mm to no more than 1.5 mm. More preferably, the flute width is at least 0.10 mm to no more than 0.2 mm. More preferably the flute depth is at least 0.75 mm to no more than 1.25 mm. A flute width of less than 0.06 mm approaches the results of an unfluted anode and therefore provides no benefit with high CV/g powders. A flute width of more than 0.3 mm is detrimental due to a dry capacitance which is inferior to unfluted anodes. It is preferable that the flute extend the length of the anode body.

The anode is formed by pressing a powder. The anode powder is preferably tantalum with a powder charge of at least 50,000 CV/g. More preferably, the anode powder has a powder charge of at least 70,000 CV/g and even more preferably the anode powder has a powder charge of at least 100,000 CV/g. Below about 50,000 CV/g the present invention provides minimal advantages since the porosity of the powder allows for adequate formation of the manganese dioxide layer. The upper limit of useable powder charge for the present invention is limited by the unavailability of powder with a powder charge of above about 200,000 CV/g. Throughout the specification the CV/g can be converted to CV/cc using a density of approximately 6 g/cc.

EXAMPLES

Example 1

Figure 3:
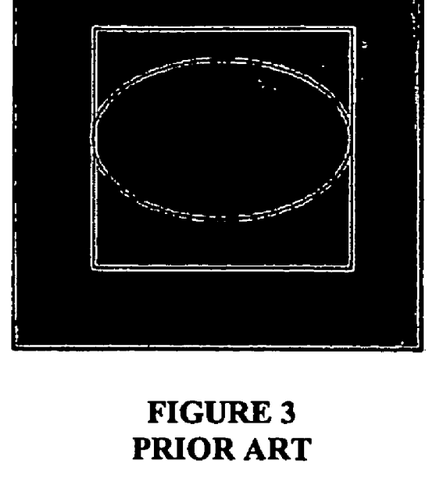
FIG. 3 illustrates the distribution of manganese dioxide for a conventional anode.
Figure 4:
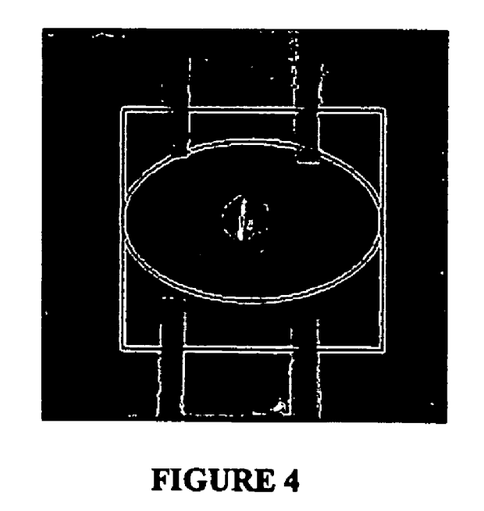
FIG. 4 illustrates the distribution of manganese dioxide for an anode of the present invention.

Two sets of anodes were pressed using 62,000 CV/g powder. The anode dimensions were 3.25×3.25×4.83 mm. The density of the anodes after pressing was 6.0 g/cc. The first set of comparative anodes employed a conventional anode with no flutes. The inventive group was pressed with four flutes of dimensions 0.20 mm wide by about 1.0 mm deep. The anodes were vacuum sintered to form porous anodes suitable for manufacturing solid electrolytic capacitors. After an anodization step to form the dielectric, both groups of anodes were processed through a series of 13 manganese nitrate dip/conversion cycles together. The anodes were then fractured to reveal the manganese dioxide distribution. Pictures were taken with an optical microscope to demonstrate the differences in manganese dioxide distribution between these two anode designs. FIG. 3 is a photomicrograph of the $MnO_2$ distribution in the conventional anode. Outside the rectangular box the comparative anodes exhibit a shading which is characteristic of heavy manganese dioxide buildup. This heavy buildup makes it even more difficult to penetrate to the center of the anode during subsequent impregnation/conversion cycles. FIG. 4 is a photomicrograph depicting the $MnO_2$ distribution in an anode with 0.2 mm wide flutes. Between the rectangular box and the oval the anodes with very narrow flutes exhibit a shading that is characteristic of modest manganese oxide buildup. The comparative anodes exhibit a shading characteristic of the dielectric, indicating that there is very little manganese oxide buildup. Inside the oval box the comparative anodes clearly have little, if any manganese dioxide coating the dielectric surfaces while the anodes with very narrow flutes exhibit characteristic of an improved manganese dioxide coating.

Both sets of anodes were processed together through an additional set of manganese nitrate dips. After application of a carbon and silver layer the electrical characteristics of the capacitors were measured.

This data is provided in table 1 below.

TABLE 1

| Group | Dry Capacitance (µF) | Capacitance Recovery (%) | Dissipation Factor (DF) | ESR (milli-ohms) | Leakage (µA) |
|---|---|---|---|---|---|
| comparative | 382 | 76% | 9.32 | 86 | 42 |
| inventive | 414 | 90% | 5.52 | 67 | 18 |

Example 2

Anodes were pressed using 62,000 CV/g powder. The anode dimensions were 3.25×3.25×4.83 mm. The density of the anodes after pressing was 6.0 g/cc. The first set of anodes employed a conventional anode (no flutes). In order to demonstrate the effect of flute width and depth on the electrical characteristics of a solid electrolytic capacitor several additional groups were pressed. These groups were pressed using 62,000 CV/g powder and external anode dimensions of 3.25×3.25×4.83 mm. The density of the anodes after pressing was 6.0 g/cc. Flute width was varied between 0.2 mm and 0.66 mm. Flute depth was varied between 0.51 mm and 1.27 mm. After sintering, the anodes were anodized to 38 volts to form the dielectric. The Ta volume was calculated based on the external dimensions of the anode (0.3.25×3.25×4.83 mm) minus the dimensions of the flutes (e.g. 4×0.56×1.0 mm). Wet capacitance was calculated from the Ta volume, press density, powder charge, and formation voltage as indicated in equation 2. The anode lots were processed through a sequence of 21 manganese nitrate dip and conversion cycles as is common in the industry. Following application of a carbon and silver layer the electrical characteristics of the capacitors were measured. The cap recovery was calculated from the ratio of the dry capacitance to the wet capacitance (×100). The data is in Table 2.

TABLE 2

| Flute Width (mm) | Flute Depth (mm) | Ta Vol. (mm³) | Wet Cap (µF) | Dry Cap (µF) | Cap Recovery (%) | Solid DF (%) |
|---|---|---|---|---|---|---|
| 0.00 | 0.00 | 51.01 | 499.4 | 391.2 | 78.3 | 10.9 |
| 0.20 | 1.02 | 47.03 | 460.4 | 413.0 | 89.7 | 5.3 |
| 0.56 | 0.51 | 45.53 | 445.7 | 372.8 | 83.6 | 8.4 |
| 0.56 | 0.76 | 42.79 | 418.9 | 359.0 | 85.7 | 7.7 |
| 0.56 | 1.02 | 40.05 | 392.1 | 346.4 | 88.4 | 5.7 |
| 0.56 | 1.27 | 37.31 | 365.3 | 330.2 | 90.4 | 4.6 |
| 0.66 | 0.51 | 44.54 | 436.0 | 361.4 | 82.9 | 10.4 |
| 0.66 | 0.76 | 41.3 | 404.3 | 350.9 | 86.8 | 8.2 |

TABLE 2-continued

| Flute Width (mm) | Flute Depth (mm) | Ta Vol. (mm³) | Wet Cap (µF) | Dry Cap (µF) | Cap Recovery (%) | Solid DF (%) |
|---|---|---|---|---|---|---|
| 0.66 | 1.02 | 38.06 | 372.6 | 336.6 | 90.3 | 5.0 |
| 0.66 | 1.27 | 34.82 | 340.9 | 294.5 | 86.4 | 3.8 |

Figure 5:
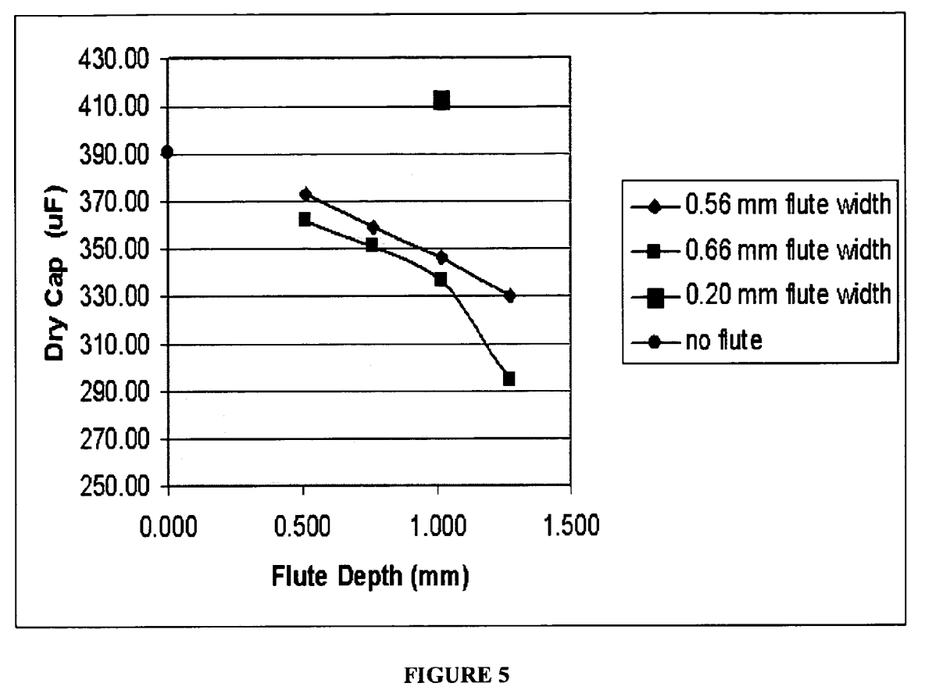
FIG. 5 graphically illustrates dry capacitance as a function of flute depth for anodes with various flute widths.

In FIG. 5 a plot of dry capacitance versus flute depth reveals that the capacitance is dropping as the flute depth increases for anodes with 0.56 and 0.66 mm flutes. For a given flute depth the dry capacitance is lower for the 0.66 mm flute width than the 0.56 flute width. These trends were expected due to the loss of Ta powder for larger flutes. Surprisingly, the dry capacitance of the anodes pressed with 0.20 mm×1.02 mm flutes was higher than that of a conventional anode without flutes. This discovery was not anticipated.

Figure 6:
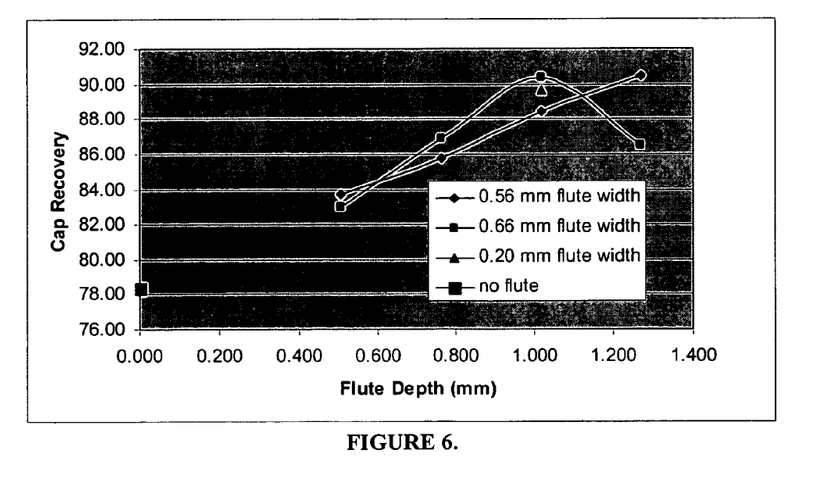
FIG. 6 depicts cap recovery versus flute depth for anodes of various flute widths.

In FIG. 6 a plot of capacitance recovery versus flute depth reveals that capacitance recovery increased with flute depth. This correlation between capacitance recovery and flute dimensions was previously unknown and not anticipated. Capacitance recovery did not depend strongly on flute width. The variations in the data for anodes with equal flute depths appear to be largely due to random variation present in any experiment.

Figure 7:
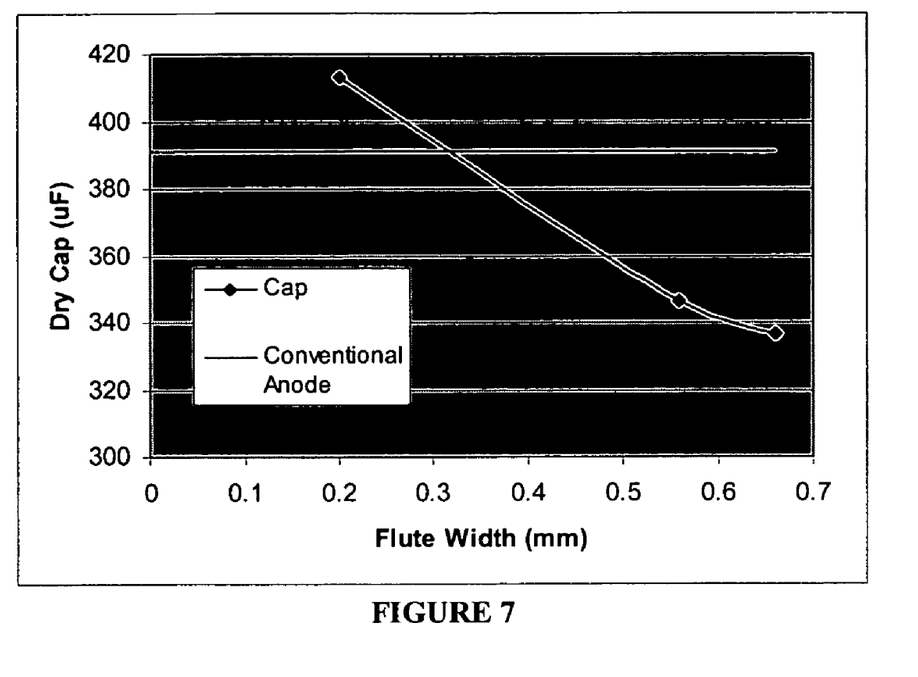
FIG. 7 plots dry capacitance versus flute width for 1.01 mm flute depth.

FIG. 7 plots dry capacitance versus flute width for 1.01 mm flute depth. The data indicate that for flute widths below approximately 0.30 mm the dry capacitance is higher for the fluted anode than the conventional anode.

Figure 8:
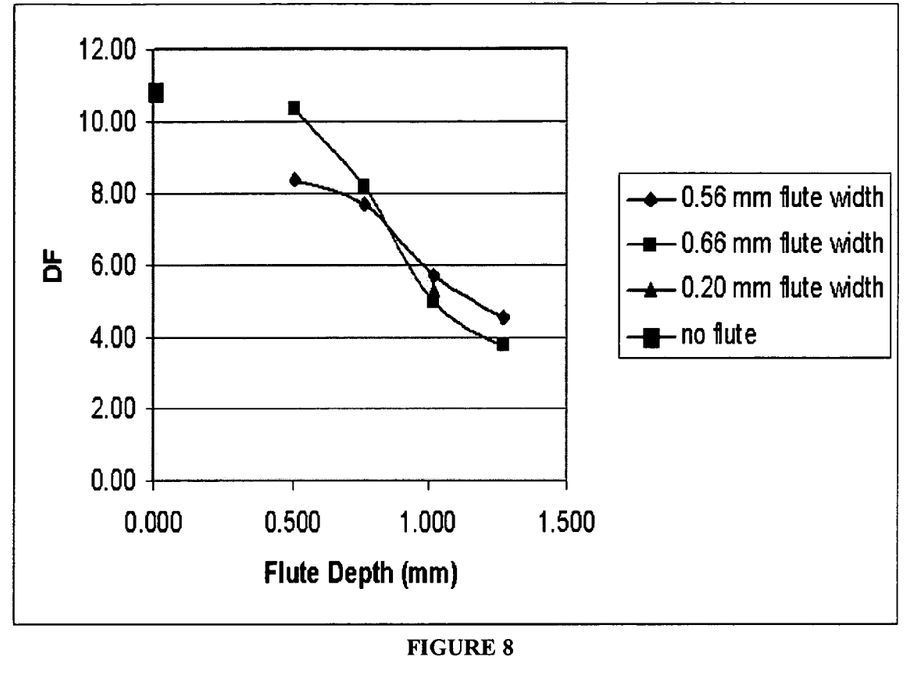
FIG. 8 is a plot of DF versus flute depth anodes of various flute widths.

Dissipation factor (DF) is another measure of the quality of the impregnation process. DF versus flute depth is plotted in FIG. 8. It shows that DF decreased as the flute depth was increased, but like capacitance recovery, was independent of flute width. The DF for all of the fluted anode groups was better than that of the conventional anode, but wide flutes were not needed to obtain the benefits in DF.

The invention has been described with particular emphasis on the preferred embodiments without limit thereto. The metes and bounds of the invention are set forth in the claims appended hereto.

The invention claimed is:

1. A capacitive element comprising:
an anode comprising one or more flutes wherein each flute has a width of at least 0.06 mm to no more than 0.2 mm;
an anode lead extending from said anode;
a dielectric coated on said anode;
a cathode coated on said dielectric;
an anode termination in electrical contact with said anode lead; and
a cathode termination in electrical contact with said cathode.

2. The capacitive element of claim 1 wherein said anode comprises a pressed powder wherein said pressed powder has a powder charge of at least 50,000 CV/g.

3. The capacitive element of claim 2 wherein said pressed powder has a powder charge of at least 70,000 CV/g.

4. The capacitive element of claim 3 wherein said pressed powder has a powder charge of at least 100,000 CV/g.

5. The capacitive element of claim 2 wherein said powder comprises tantalum.

6. The capacitive element of claim 1 wherein said flute has a width of no more than 0.1 mm.

7. The capacitive element of claim 1 wherein said flute has a depth of at least 0.50 mm.

8. The capacitive element of claim 7 wherein said flute has a depth of at least 0.50 mm to no more than 1.5 mm.

9. A capacitive element comprising:
an anode comprising one or more flutes wherein each flute has a width of at least 0.06 mm to no more than 0.3 mm;
an anode lead extending from said anode;
a dielectric coated on said anode;
a cathode coated on said dielectric;
an anode termination in electrical contact with said anode lead; and
a cathode termination in electrical contact with said cathode wherein said flute has a depth of at least 0.75 mm to no more than 1.25 mm.

10. A process for forming a capacitor comprising:
pressing a powder into an anode comprising flutes with a width of at least 0.06 mm to no more than 0.2 mm;
providing an anode lead wherein said anode lead is in electrical contact with said anode;
forming a dielectric on said anode;
forming a cathode on said dielectric;
forming an anode termination in electrical contact with said anode; and
forming a cathode termination in electrical contact with said cathode.

11. The process for forming a capacitor of claim 10 wherein said anode comprises a pressed powder wherein said pressed powder has a powder charge of at least 50,000 CV/g.

12. The process for forming a capacitor of claim 11 wherein said pressed powder has a powder charge of at least 70,000 CV/g.

13. The process for forming a capacitor of claim 12 wherein said pressed powder has a powder charge of at least 100,000 CV/g.

14. The process for forming a capacitor of claim 10 wherein said powder comprises tantalum.

15. The process for forming a capacitor of claim 10 wherein said flute has a width of no more than 0.1 mm.

16. The process for forming a capacitor of claim 10 wherein said flutes have a depth of at least 0.50 mm.

17. The process for forming a capacitor of claim 16 wherein said flutes have a depth of at least 0.50 mm to no more than 1.5 mm.

18. A process for forming a capacitor comprising:
pressing a powder into an anode comprising flutes with a width of at least 0.06 mm to no more than 0.3 mm;
providing an anode lead wherein said anode lead is in electrical contact with said anode;
forming a dielectric on said anode;
forming a cathode on said dielectric;
forming an anode termination in electrical contact with said anode; and
forming a cathode termination in electrical contact with said cathode wherein said flutes have a depth of at least 0.75 mm to no more than 1.25 mm.

19. A capacitive element comprising:
a tantalum anode formed from tantalum powder with a powder charge of at least 50,000 CV/g wherein said tantalum anode comprising flutes wherein each flute has a width of no more than 0.2 mm and a depth of 0.50 mm to 1.50 mm;
an anode lead extending from said anode;
a dielectric coated on said anode;
a cathode coated on said dielectric;
an anode lead in electrical contact with said anode lead; and
a cathode lead in electrical contact with said cathode lead.

20. The capacitive element of claim 19 wherein said tantalum powder has a powder charge of at least 70,000 CV/g.

21. The capacitive element of claim 20 wherein said tantalum powder has a powder charge of at least 100,000 CV/g.

22. The capacitive element of claim 19 wherein said flute has a depth of at least 0.75 mm to no more than 1.25 mm.

23. The capacitive element of claim 19 wherein said flutes have a width of at least 0.06 mm.

24. The capacitive element of claim 19 wherein said flutes have a width of no more than 0.1 mm.

25. A capacitive element comprising:
   an anode comprising one or more flutes wherein each flute has a width of at least 0.06 mm to no more than 0.2 mm;
   an anode lead extending from said anode;
   a dielectric coated on said anode; and
   a cathode coated on said dielectric.

* * * * *